No. 881,864. PATENTED MAR. 10, 1908.
G. LEWIN.
MEANS FOR TRANSMITTING POWER ELECTRICALLY.
APPLICATION FILED JULY 2, 1907.

No. 881,864. PATENTED MAR. 10, 1908.
G. LEWIN.
MEANS FOR TRANSMITTING POWER ELECTRICALLY.
APPLICATION FILED JULY 2, 1907.

No. 881,864. PATENTED MAR. 10, 1908.
G. LEWIN.
MEANS FOR TRANSMITTING POWER ELECTRICALLY.
APPLICATION FILED JULY 2, 1907.
6 SHEETS—SHEET 5.

UNITED STATES PATENT OFFICE.

GREGOR LEWIN, OF SCHÖNEBERG, NEAR BERLIN, GERMANY, ASSIGNOR TO SIEMENS-SCHUCKERT-WERKE, G. M. B. H., OF BERLIN, GERMANY, A CORPORATION OF GERMANY.

MEANS FOR TRANSMITTING POWER ELECTRICALLY.

No. 881,864.      Specification of Letters Patent.      Patented March 10, 1908.

Application filed July 2, 1907. Serial No. 381,906.

*To all whom it may concern:*

Be it known that I, GREGOR LEWIN, engineer, a subject of the Emperor of Russia, resident of Schöneberg, near Berlin, Germany, have invented a certain new and useful Improvement in Means for Transmitting Power Electrically, of which the following is a specification.

The present invention relates to means for independently regulating a plurality of electric motors by means of one single separately excited controlling generator.

In electrical transmission of power plants the working of the same has frequently proved very preferable with such dynamos in which the generator is connected with the motor in such a manner that the armature of the motor is permanently in series with the armature of the generator. The regulation of the speed and of the direction of rotation of the motor, as well as the starting and stopping of the same, is only effected by the tension of the separately excited generator being varied from a positive maximum to zero and then to a negative maximum by varying the excitation of the generator. The field winding of the separately excited generator can thus be fed from a battery of accumulators or from a special exciting machine. Such generators as above described are hereafter referred to as controlling generators in this specification and in the claims belonging thereto. The conditions are frequently such that a plurality of electric motors must, generally speaking, be simultaneously and uniformly regulated. In this case the motors are preferably regulated by means of one single controlling dynamo, whereby, under certain circumstances, a substantial saving in space and cost of plant is effected. Particularly on ships, for example, the saving in space which is made possible by such an arrangement can be of considerable importance.

Now an important object of the present invention is means for regulating continuous and alternate current motors quite independently one of another as occasion requires, said motors being driven, generally speaking, by one single controlling generator according to the above definition.

The invention consists substantially in providing means for varying the exciting current for each electric motor which permits the number of revolutions of electric motors to be varied independently of one another within very wide limits. These electric motors may be either series or shunt wound.

The electric motors which are to be regulated may be connected either in parallel or in series. As, however, with parallel connection, the regulation of the electric motors is considerably more troublesome, and also as the electric motors cannot be regulated so independently one of another and not within such wide limits as in the case of series connection, preference is as a rule given to connecting the motors in series.

When the armatures of a plurality of motors are connected in series with the armature of the controlling generator, the number of revolutions of the individual motors is regulated independently one of another by their excitation being varied. If the exciting current of the one motor is weakened, this will not run quicker, as would be the case if the motor were connected singly with the dynamo, but it will run slower. By diminishing step by step the excitation of the individual motor, the speed can be gradually reduced to zero. Also the direction of rotation of a single motor can be reversed by the exciting current being first brought to zero and by the field being then magnetized in the opposite direction. The number of revolutions of the other motors will increase simultaneously with the weakening of the field of the one motor, if the excitation of the other motors is not varied and the armature tension of the controlling dynamo remains the same. If the number of revolutions is however to be kept constant, either the field of the other electric motors must be strengthened or the tension of the generator must be diminished, or both means may be employed simultaneously. This method of regulation is of specially great value for driving ships, and particularly for such machines which are to be driven the resistance of which to be overcome by the motor varies with the number of revolutions. For driving ships an arrangement of such a kind is of particularly great importance that the two propellers are driven by two electric motors which are connected in series and driven in common by one single controlling generator. The advantage lies in the employment of one single generator, which can be driven by a steam turbine for example, whereby space and weight are saved. For example, if the ship is to veer round, the excitation of the one electric motor is weakened, the consequence of which is that this motor and the propeller coupled with it run slower, and simultaneously the other electric motor and the appertaining propeller run faster. By strengthening or weakening the field of the second electric motor, its speed can be respectively increased or diminished still more as desired. Further, it is possible at any time, by varying the excitation of the current generator itself, to simultaneously vary the tension generated by it and thereby the speed of the two motors in series with it. This uniform influencing of the two electric motors may be effected simultaneously with the individual regulation of the same. It is thereby attained that the speed with which the ship is swung round can be varied within wide limits. The motors can also be regulated at once in the above described manner by the one running in a direction opposite to the other, which is of special importance in driving ships. The speed of the other motor does not require in itself to be varied at all, and the current generator likewise does not require to be regulated, although it may be preferable to do so under certain circumstances, in order, for example, to prevent the generator being overloaded.

In order that the invention may be clearly understoood reference is made to the accompanying drawings in which various embodiments are shown diagrammatically by way of example as applied to the driving of ships propellers, for which purpose they are particularly suitable, it being understood of course that they may also be employed for other purposes.

In the drawings: Fig. 4 is a modification of the arrangements in Figs. 1 and 3, there being two generators provided; whereas

Figure 1:
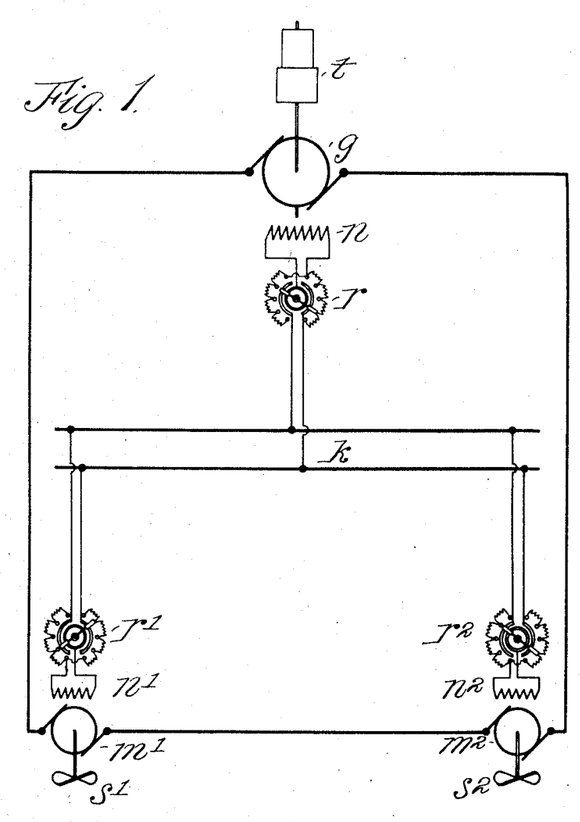
—Figure 1 shows one arrangement, the field windings of two motors in series with the generator being connected with a common continuous current system.

Referring to the drawings, Fig. 1 shows generally an arrangement by which two motors $m_1$ and $m_2$ connected in series and driving ships' propellers $s_1$ and $s_2$ are regulated from the common controlling generator $g$. This generator is driven at constant speed by the prime mover $t$, for example a steam turbine. The tension of the generator $g$ can be varied between a positive and a negative maximum by varying the excitation of the field winding $n$ by means of the regulating device $r$. A continuous current system $k$ is taken as the source of current for the excitation. The excitation may also be effected by means of a special exciting machine which is driven by the prime mover $t$. When the motors are to be regulated in common and equally, this is effected by means of the regulator $r$. But in order to be able to regulate the electric motors independently one of another, in accordance with the present invention special regulators $r_1$ and $r_2$ are provided in the field circuits of the motors by which the excitation of the field windings $n_1$ and $n_2$ of the two motors can be varied between a positive and a negative maximum in the above described manner. In the arrangement according to Fig. 1 the system $k$ likewise serves as the source of current for the excitation of the motors.

Figure 2:
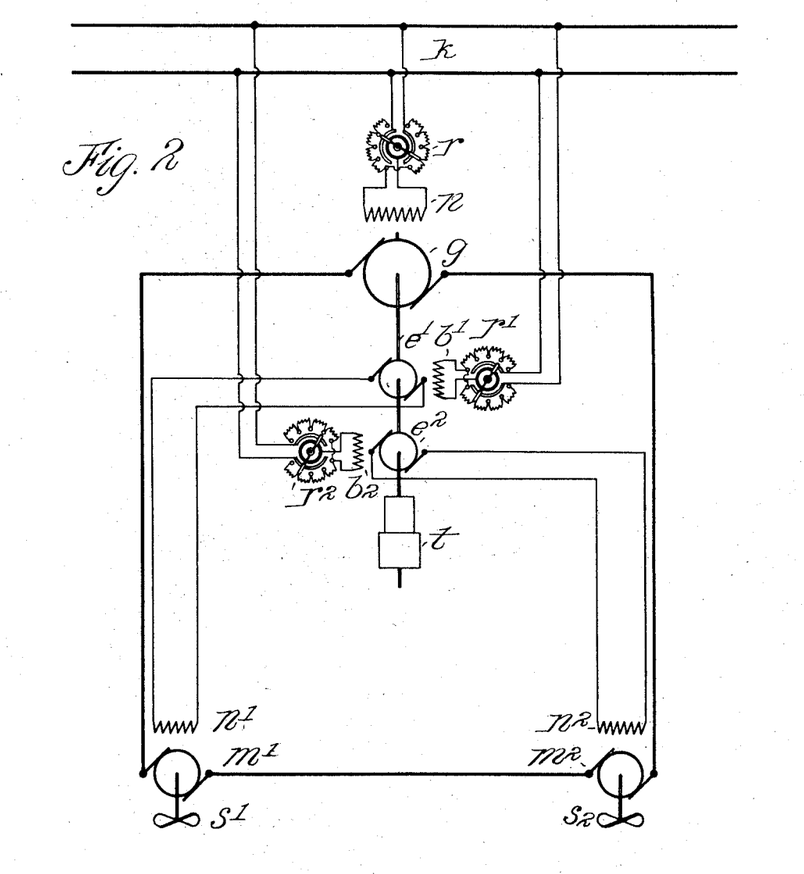
Fig. 2 is a modification, the excitation of the motors being controlled by other dynamos, the latter being connected with a common continuous current system.

In Fig. 2 an arrangement similar to that shown in Fig. 1 is represented. The field windings of the motors $m_1$ and $m_2$ are not, however, connected directly with the system $k$, but with the exciting dynamos which are arranged specially for each motor on the shaft of the prime mover $t$. In this arrangement the motors are regulated by the fields of the exciting machines being regulated as desired by means of the regulating switches $r_1$ and $r_2$. The tension of the controlling dynamo can be varied within optional limits by a regulator $r$.

An important advantage of the arrangement of special exciting machines is that the regulation is effected by means of weak currents only, which is particularly advantageous when it is a question of motors of considerable capacity, because in this case the regulating apparatus can have small dimensions and the conductors which lead to these apparatus can be very thin and can be conveniently led to a place at a considerable distance from which the control or regulation is effected, for example the bridge-deck on board ship.

Figure 3:
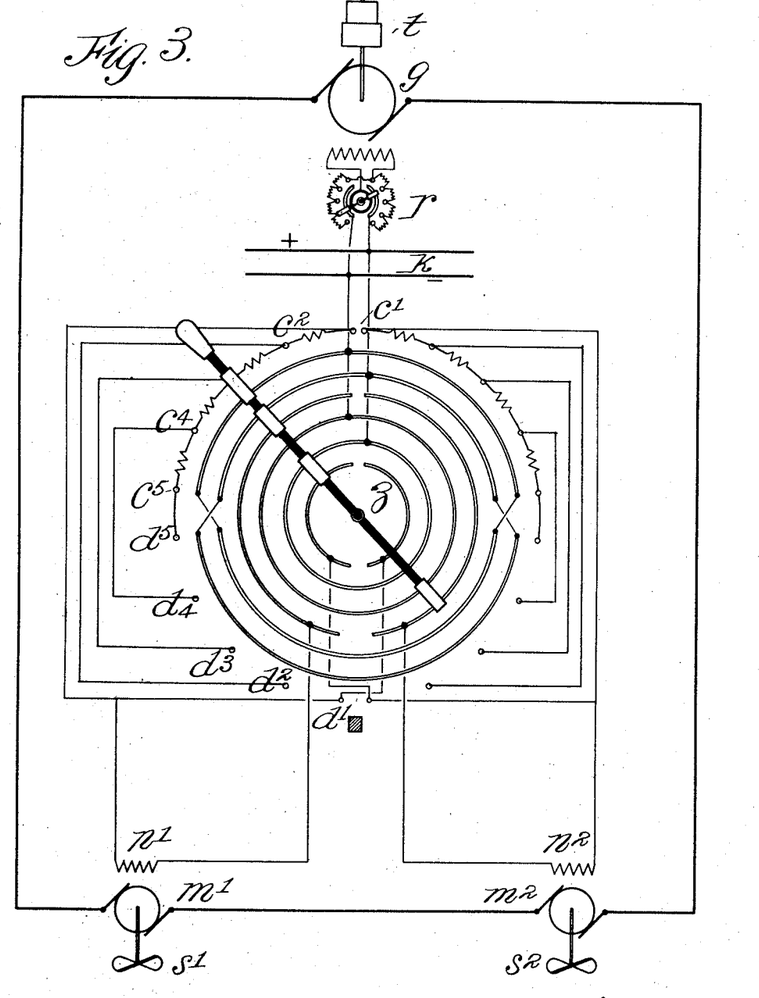
Fig. 3 is another modification of the arrangement shown in Fig. 1, the excitation of the two motors being controlled by a common regulator.

It is preferable, when there are only two motors driven by one controlling generator, to combine the two switches $r_1$ and $r_2$ of the arrangement according to Figs. 1 and 2 to one single switching apparatus $z$, as represented in Fig. 3. By means of this arrangement only one handle needs to be operated and therefore errors are avoided. Namely, the exciting currents of the two motors are prevented from being simultaneously varied in such a manner that the speed of the motors would increase in an undesirable manner. With this regulator, when the field $n_1$ is weakened the field $n_2$ is kept constant. The speed of the motor $n_1$ is reduced therefore and that of $m_2$ is increased. But if the speed of $m_1$ is to be reduced without the motor $m_2$ running faster, this can be effected by regulating the tension at the controlling generator $g$ by means of the regulator $r$. The contacts $c_1$ and $d_1$, $c_2$ and $d_2$, and so on, are directly connected by conductors in the arrangement according to Fig. 3.

Figure 4:
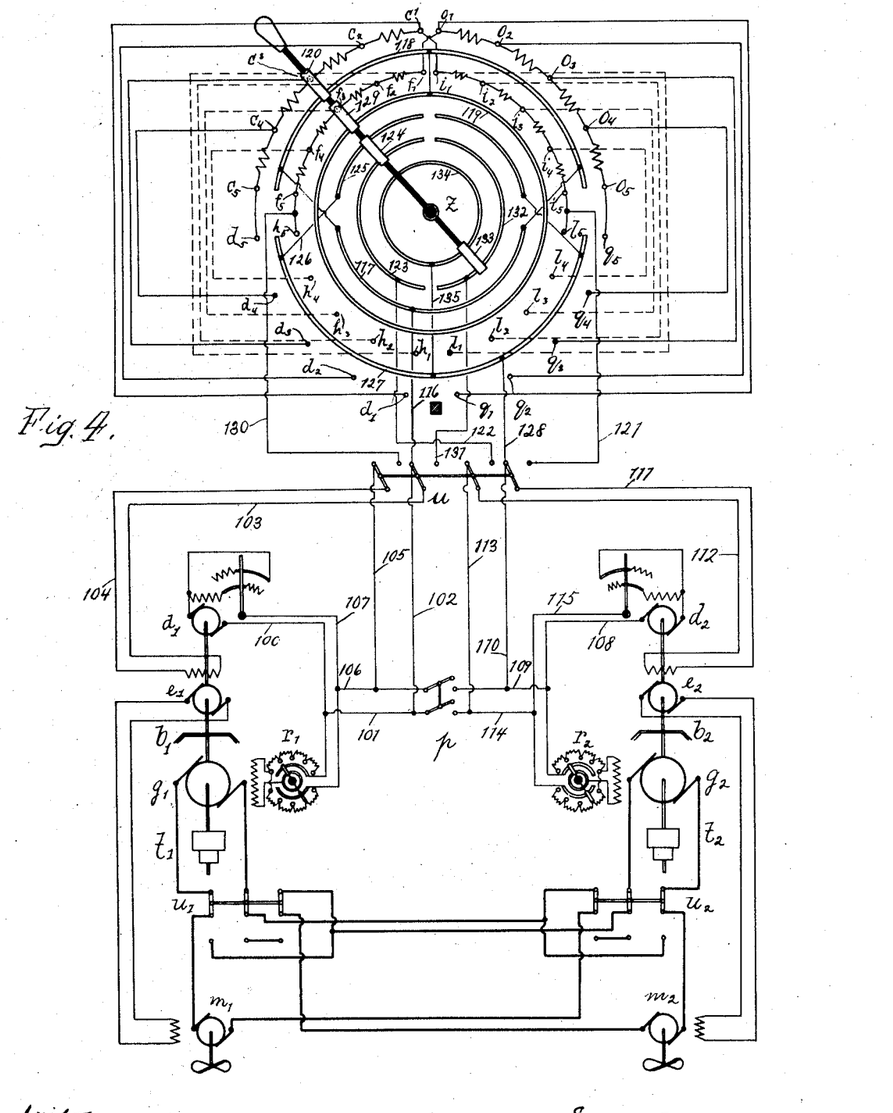

Instead of the field windings of the motors being fed from the continuous current system as in the arrangement according to Fig. 3, an exciting machine can be arranged on the shaft of the prime mover for each motor and the excitation of these exciting machines can be varied by means of one common regulator. Further the importance of the arrangement in accordance with the present invention for plants on ships lies also in the possibility which there is in these plants, in which two prime movers and two generators are employed, of maintaining both the motors working with only one single generator at all times, even if at reduced speed, each set comprising one prime mover and one controlling generator being normally used for driving one propeller. Such an arrangement is shown in Fig. 4. The controlling generators $g_1$ and $g_2$ and the exciting machines $e_1$ and $e_2$ for the motors are arranged on the shafts of the prime movers $t_1$ and $t_2$. There are also dynamos $d_1$ and $d_2$ on the latter shafts which serve for feeding the field windings of the generators $g_1$ and $g_2$ and the field windings of the exciting machines $e_1$ and $e_2$.

With the switches $u$ and $p$ in the position shown the field of exciter machine $e_1$ is fed by dynamo $d_1$ through conductors 100, 101, 102, 103, 104, 105, 106, 107, while the field of exciter machine $e_2$ is fed by dynamo $d_2$ through conductors 108, 109, 110, 111, 112, 113, 114, 115. In this position of the switches $u$ and $p$ the controller $z$ is entirely cut out. The motors $m_1$ and $m_2$ are regulated by controllers $r_1$ and $r_2$. If now it be desired to shut down one of the prime movers $t_1$ or $t_2$, its corresponding clutch $b_1$ or $b_2$ is opened, the switch $p$ is closed, switch $u$ thrown to the right, and switch $u_1$ or $u_2$ thrown down. For example, supposing for some reason it be desired to shut down the prime mover $t_2$, the clutch $b_2$ is opened, the switch $p$ closed and the switch $u$ thrown to the right. Switch $u_2$ is thrown down, thus connecting the armature of motor $m_2$ in series with the armature of motor $m_1$, both of which are then fed by generator $g_1$. By throwing switch $u$ to the right it is obvious that conductors 103 and 104 are no longer directly connected with conductors 102 and 105 but conductors 103 and 104 are then connected with them through the controller $z$. Likewise the conductors 111 and 112 are no longer directly connected with conductors 110 and 113, but are connected with them through the controller $z$. The effect of closing the switch $p$ is to connect the dynamo $d_2$ with the dynamo $d_1$ across by conductors 101, 114 and 106, 109, and since the dynamo $d_2$ is no longer driven by the prime mover $t_2$, it therefore runs as a motor by current from dynamo $d_1$, and turns the exciter machine $e_2$. Supposing the controller arm of controller $z$ to be in the position shown the fields of exciters $e_1$ and $e_2$ are both fed from the one dynamo $d_1$. Current leaves dynamo $d_1$ by conductor 100 and passing through the switch $p$ goes direct by conductors 114 and 115 through field and armature of dynamo $d_2$, and back by conductors 108, 109, switch $p$, 106 and 107 to dynamo $d_1$. A branch circuit, however, leads from conductor 101 by conductor 102 and returns to conductor 109 by conductor 110. The current which leaves by conductor 102 passes through conductor 116 to segment 117 of the controller $z$ which is electrically connected with the upper segment 118. The current then divides, one part passing through brush 120 and the other part passing down into ring 119. From 118 the current takes the following course: brush 120, resistances $c_3$ to $c_1$ and $i_1$ to $i_5$, conductor 121, switch $u$, conductor 111, field of exciter $e_2$, conductor 112, switch $u$, conductor 122, segment 123, brush 124, segment 125, conductor 126, segment 127, conductor 128 and conductor 110 back to the original circuit, returning to dynamo $d_1$ by conductor 109, switch $p$ and conductors 106 and 107. Taking up the other branch from segment 118, this current passes down into ring 119, leaves by brush 129, passes through resistance elements $f_3$ to $f_5$, conductor 130, switch $u$, conductor 104, field of exciter $e_1$, conductor 103, switch $u$, conductor 131, segment 132, brush 133, inner ring 134, conductor 135, segment 127 and conductor 110 back to original circuit at conductor 109. It is thus seen that the fields of exciters $e_1$ and $e_2$ are fed in parallel from the single dynamo $d_1$ and can be regulated in common by controller $r_1$. It is also apparent that by moving the controller arm of controller $z$ into a horizontal position at the left the resistance between circle 119 and conductor 130 would be diminished while at the same time the resistances between segment 118 and conductor 121 would be increased. Therefore the field of exciter $e_1$ would be strengthened and the fields of exciter $e_2$ be weakened. In this way the fields of the two exciters may be varied with respect to each other.

When the operating lever of rheostat $z$ is moved into a position below the horizontal at the left, the current through the field of exciter $e_2$ is reversed. In that position, the branch current leaves the original circuit conductor 101 by conductor 102 and passing through conductor 116 reaches segment 117. Segment 117 is always connected with segment 118 and ring 119 and therefore part of the current from segment 117 passes through these conductors and leaves the ring 119 by brush 129, which as before, leads through a resistance, in this case terminal $h_4$, and resistances $f_4$ to $f_5$ for example, and passes through the same circuit as before described to the field of exciter $e_1$ in the same direction as before and returns, as before, to the main circuit conductor 109. The other portion of the circuit, however, which branches from segment 117, passes through brush 124 into segment 123, from which the current travels in the opposite direction from before, through the conductor 122, switch $u$, conductor 112, field of exciter $e_2$, conductor 111, switch $u$, conductor 121, resistances $i_5$ to $i_1$, and resistances $c_7$ to $c_4$ terminal 4 (which is electrically connected with $c_4$), brush 120, segment 127, and back to original circuit by conductor 110. Thus, field of exciter $e_2$ is reversed, while the field of exciter $e_1$ is energized as before.

To reverse the field of exciter $e_1$ without reversing the field of exciter $e_2$ from its original direction, the controller arm is moved into a position below the horizontal on the right of the controller $z$. While in that position, current leaves the original circuit conductor 101 by conductor 102 and passes, as before, by conductor 116 into segment 117. From segment 117, current divides, as before, a part of it passes into contact ring 119 through the segment 118, which is electrically connected with ring 119 and segment 117. Contact ring 119, in this case, however, does not feed the field of exciter $e_1$ as in the two cases before, but now the current passes through brush 129 and through resistance $i_4$, $i_5$, for example, and through conductor 121, switch $u$, conductor 111, field of exciter $e_2$ in the same direction as in the first case, conductor 112, switch $u$, conductor 122, segment 123, brush 133, contact ring 134, conductor 135, segment 127, and back, by conductor 110, to the original circuit conductor 109. The other branch of the current, from segment 117, passes through brush 124 to segment 132, through conductor 131, switch $u$, conductor 103, through the field of exciter $e_1$ in opposite direction from the first case, through conductor 104, switch $u$, conductor 130, resistances $f_5$ to $f_1$, $o_1$ to $o_4$ and contact $g_4$ to segment 127 and back, by conductor 110, to the original circuit conductor 109. It is thus seen that by operating the controller arm of controller $z$, the current may first be maintained in normal direction for forward running through the fields of exciters $e_1$ and $e_2$, and varied as to strength in one relatively to the other, and second, be reversed in field of exciter $e_2$ while maintained in normal direction through field of exciter $e_1$, and third, be reversed in said field exciter $e_1$ while maintained in normal direction in field of exciter $e_2$. It is obvious that by regulating the fields of the exciters $e_1$ and $e_2$, the motors $m_1$ and $m_2$ with their corresponding propellers are caused to operate in any desired direction and at any desired speed.

It is preferable that the motors work with weakened fields in order to be able to utilize the energy supplied by the generator $g_1$ as favorably as possible. Namely, in driving ships, the work dissipated by the propeller is about proportional to the third power of the number of revolutions. When the one generator is placed out of work the capacity of the electric plant sinks to one half what it was, and also the number of revolutions of the two motors sinks to one half of that which obtains when they are connected in series. It follows from the above, however, that at this reduced speed the controlling generator $g_1$ is not fully utilized. Its full utilization will be obtained by the electric motors being allowed to run faster, which is effected by simultaneously weakening the fields of the two motors. For this purpose the regulator $z$ which is represented in Fig. 4 is so formed that in the exciting circuit of each motor additional steps of resistance $i_1 i_2$, $i_2 i_3$, and so on, or $f_1 f_2$, $f_2 f_3$, and so on, suitable for the conditions of working are inserted when the lever of the switch is in the central position. If the motors are to be regulated independently of one another, more resistance $c_1 c_2$, $c_2 c_3$, and so on, or $o_1 o_2$, $o_2 o_3$ and so on, is inserted in the circuit of that motor which is to run slower, and simultaneously the additional resistance is cut out step by step in the exciting circuit of the other motor. If the lever of the switch is turned 90° from the central position to the one side, the one motor runs at a maximum speed, whereas the other is stationary. When the lever of the switch is rotated 180°, the number of revolutions of the two motors is equal, but the motors run in opposite directions. When the lever of the switch is turned to the other side, the reverse takes place. Thus when one generator is not working the plant can be kept running, even if with a correspondingly reduced speed, without influencing the capability of maneuvering. Not only is a far reaching reserve and increased security of operation obtained in the plant, but also the possibility of just as economic operation with reduced speed as with full speed, which is of the greatest importance particularly for men-of-war.

Figure 5:
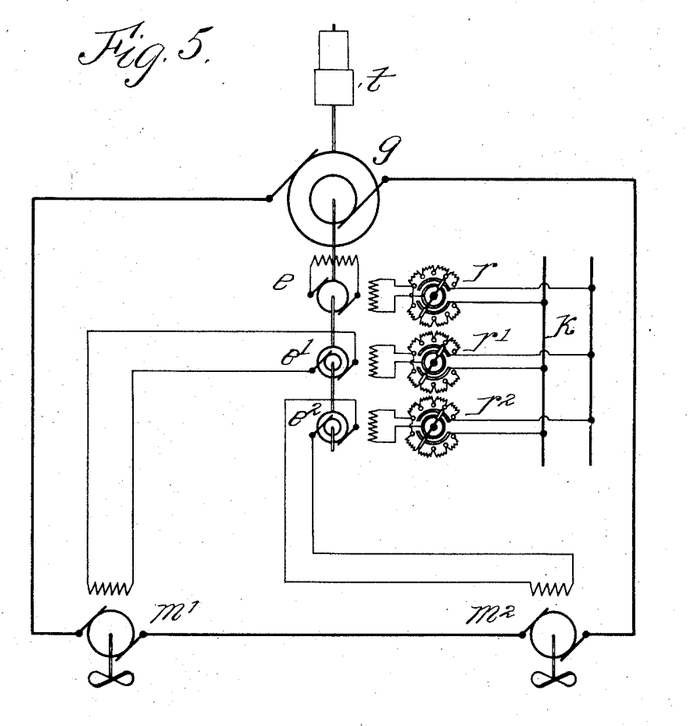
Fig. 5 shows an arrangement similar to that in Fig. 2, alternate current machines being employed.

The propellers of ships can be driven not only by continuous current motors, as is represented in Figs. 1 to 4, but also by means of alternate current motors in a similar way. In Fig. 5 such an alternate current plant with separately excited shunt wound motors is represented which substantially agrees with the arrangement according to Fig. 2. The field of the controlling generator $g$, in the circuit of which the two motors $m_1$ and $m_2$ are situated, is excited by the continuous current dynamo $e$. The tension of the generator is regulated, for example, by varying the exciting current of the exciting machine $e$ by means of the regulator $r$. The fields of the alternate current motors are excited by the alternate current exciting machines $e_1$ and $e_2$. The current of these exciting machines is of different phase from the alternate current of the main generator. The size of the angle of this difference of phase must be chosen, having regard to the average difference of phase in the plant, that the most favorable conditions are obtained both for running the electric motors and for continuity of working. The exciting machines are rigidly coupled with the main generator corresponding to the most favorable angle. When the motors are to be regulated independently of one another, this can be effected in the above described manner by the regulators $r_1$ and $r_2$ in the exciting current circuit of the dynamos $e_1$ and $e_2$.

Figure 6:
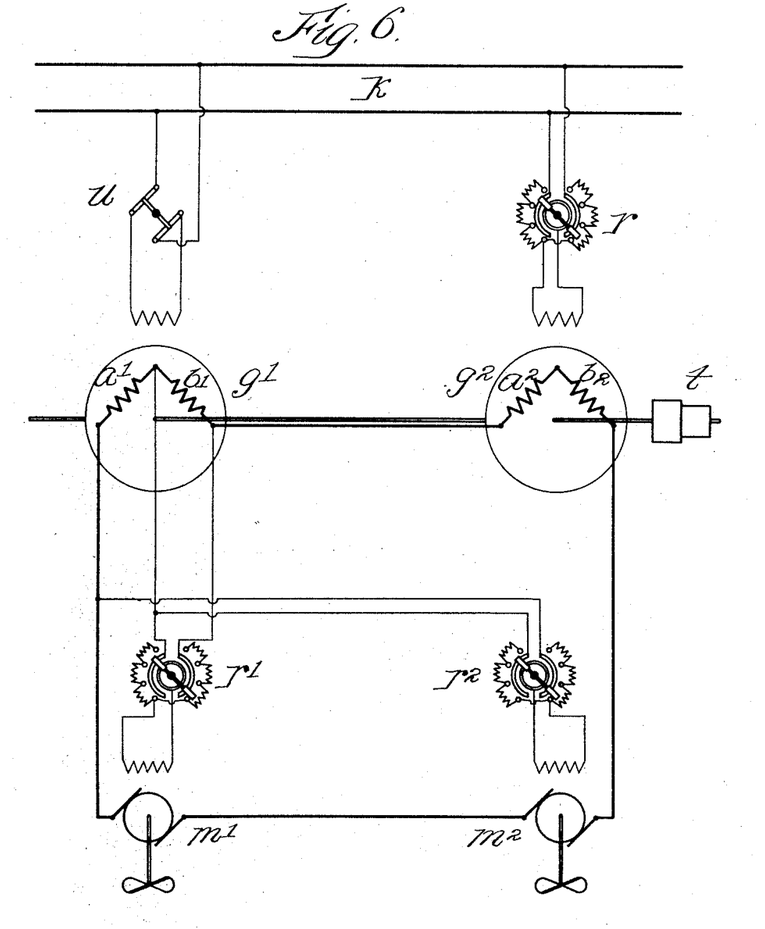
Fig. 6 is a modification of the arrangement in Fig. 5, two alternate current controlling generators being employed.

In order to avoid the employment of special exciting machines, use may be also be made of the arrangement according to Fig. 6. In this arrangement the generator is sub-divided into two machines $g_1$ and $g_2$ which are mechanically coupled with one another, and their armatures each carry two armature windings $a_1 b_1$, or $a_2 b_2$, which are displaced about 90 degrees. The generators and motors are connected in series. Only the one generator, for example $g_2$, can be regulated in its tension between a positive and a negative maximum by means of the regulator $r$, the other generator $g_1$ being excited with constant current. The field winding of the motor $m_1$ is excited by the winding $b_1$ of the generator $g_1$, as the current in this winding $b_1$ has a difference of phase of about 90 degrees from that of the armature current. In the same manner the field of $m_2$ is excited from the winding $a_1$ of the generator $g_1$. Both the field windings of the motors are thus connected to sources of current having a constant tension, as the excitement of the dynamo $g_1$ is not varied. The motors can be regulated independently one of the other in an optional manner by the regulators $r_1$ and $r_2$.

The connection according to Fig. 6 above described permits the motors to be regulated, in common and uniformly only in one direction of rotation from a maximum to standstill. If the direction of rotation is to be capable of reversal, a reversing switch $u$ must be arranged in the field magnet circuit of the generator $g_1$, which switch is preferably connected mechanically with the regulator $r$ in the exciting circuit of the generator $g_2$.

The motors employed in the above described arrangements have been described as motors with separate excitation. It is of course also possible to employ series wound motors. These motors can be regulated within just as wide limits as the separately excited motors. The plant is however less efficient; the motors are regulated in that case by resistances connected in parallel with their field windings and of course these resistances must be proportioned for large strengths of current, and accordingly dissipate much energy, and moreover require conductors leading to them of considerable size.

It is known that the armatures of motors have hitherto been put in series in a constant-current circuit which is entirely independent of the fields, each field being provided with a regulator. Such an arrangement in which a constant-current generator is used differs substantially from that in accordance with the present invention employing one or more controlling generators of the type described, and I do not claim the same broadly.

What I claim as my invention and desire to secure by Letters Patent is:—

1. In means for transmitting power electrically, the combination with a separately excited controlling generator and means for varying the field excitation of the same; of a plurality of motors, an armature circuit in which the armatures of said motors are connected in series with each other and with the armature of said controlling generator, means for exciting the fields of said motors independently of the tension in said armature circuit and reversible means for varying the field excitation of each of said motors independently of the other.

2. In means for transmitting power electrically, the combination with a separately excited controlling generator and means for varying the field excitation of the same; of a plurality of motors, a plurality of propellers operatively connected with and adapted to be driven by said motors, an armature circuit in which the armatures of said motors are connected in series with the armature of said controlling generator, means for exciting the fields of said motors independently of the tension in said armature circuit and means for varying the field excitation of each of said motors independently of the other.

3. In means for transmitting power electrically, the combination with a separately excited controlling generator and means for varying the field excitation of the same; of a plurality of motors, a plurality of propellers operatively connected with and adapted to be driven by said motors, an armature circuit in which the armatures of said motors are connected in series with each other and with the armature of said controlling generator, means for exciting the fields of said motors independently of the tension in said armature circuit and means for varying the field excitation of each of said motors independently of the other.

4. In means for transmitting power electrically, the combination with a separately excited controlling generator and means for varying the field excitation of the same, of a plurality of motors, a plurality of propellers operatively connected with and adapted to be driven by said motors, an armature circuit in which the armatures of said motors are connected in series with the armature of said controlling generator, means for exciting the fields of said motors independently of the tension in said armature circuit and reversible means for varying the field excitation of each of said motors independently of the other.

5. In means for transmitting power electrically, the combination with a separately excited controlling generator and means for varying the field excitation of the same, of a plurality of motors, a plurality of propellers operatively connected with and adapted to be driven by said motors, an armature circuit in which the armatures of said motors are connected in series with each other and with the armature of said controlling generator, means for exciting the fields of said motors independently of the tension in said armature circuit and reversible means for varying the field excitation of each of said motors independently of the other.

6. In means for transmitting power electrically, the combination with a controlling generator, having separate field-coils, a source of current, and a reversible regulator in circuit with said field-coils and said source of current, of a plurality of motors, having separate field-coils, an armature circuit in which the armatures of these motors are connected in series with the armature of said generator, a plurality of separately excited generators, each armature of the latter being in series with one of said field-coils of the motors, and a plurality of reversible regulators connecting each of the field-coils of the latter generators with said source of current, whereby said motors can be regulated by varying the tension of said controlling generator as well as by varying their own excitation.

7. In means for transmitting power electrically, two controlling generators, two motors, driving two propellers, and two reversing switches, the armatures of said generators being each normally connected directly in series with only one armature of said motors and adapted to be cut out of circuit by said switches, thereby connecting the armature of the other generator in series in one armature circuit with the two armatures of said motors, in combination with separate means for exciting each of said generators, means for varying the excitation effected by the latter means and means for regulating the fields of the motors independently of each other and of the armature circuit, whereby when one of said controlling generators is cut out of circuit said motors can be regulated by varying the tension of the other generator as well as by varying their own excitation.

8. In means for transmitting power electrically, two controlling generators, two motors, driving two propellers, and two reversing switches, the armatures of said generators being each normally connected through said switches directly in series with only one armature of said motors and adapted to be cut out of circuit by said switches, thereby connecting the armature of the other generator in series in one armature circuit with the two armatures of said motors, in combination with separate field-coils for each of said generators, a source of current, reversible regulators connecting each of said generator field-coils with the latter, separate field-coils for each motor, motor-exciting generators having separate field-coils and each having their armature connected with one of said motor field-coils, and a reversible regulator connecting the field-coils of the motor-exciting generator with said source of current, whereby when one of said controlling generators is cut out of circuit said motors can be regulated by varying the tension of the other generator as well as by varying their own excitation.

In testimony whereof, I have signed my name to this specification in the presence of the two subscribing witnesses.

GREGOR LEWIN.

Witnesses:
 WOLDEMAR HAUPT,
 HENRY HASPER.